United States Patent [19]
Bristow

[11] Patent Number: 5,413,437
[45] Date of Patent: May 9, 1995

[54] DOUBLE-SIDED HOLE SAW

[76] Inventor: Michael M. Bristow, 1605 Jade Ave., Chula Vista, Calif. 91911

[21] Appl. No.: 254,256

[22] Filed: Jun. 6, 1994

Related U.S. Application Data

[63] Continuation-in-part of Ser. No. 840,135, Feb. 24, 1992, abandoned.

[51] Int. Cl.⁶ .................. B23B 35/00; B23B 51/04
[52] U.S. Cl. ..................... 408/1 R; 408/80; 408/204; 408/209
[58] Field of Search .......... 408/1 R, 80, 81, 82, 408/201, 204, 206, 207, 209, 703; 51/181 R; 144/20, 21, 23

[56] References Cited

U.S. PATENT DOCUMENTS

| | | |
|---|---|---|
| 2,725,766 | 12/1955 | Van Heuhelom ............ 408/204 |
| 3,550,229 | 12/1970 | Zenses ........................ 144/23 |
| 4,380,990 | 4/1983 | Giardini ...................... 408/204 |
| 4,541,758 | 9/1985 | Frank et al. ................. 408/206 |
| 4,968,189 | 11/1990 | Pidgeon ...................... 408/204 |

FOREIGN PATENT DOCUMENTS 14287 2/1977 Japan ........................ 408/206

*Primary Examiner*—Daniel W. Howell
*Attorney, Agent, or Firm*—Brown, Martin, Haller & McClain

[57] ABSTRACT

A double arbor has a shaft with a slideable first arbor at one end and a fixed second arbor at the other. A first hole saw of the already-cut, incorrect diameter is mounted on the first arbor. A second hole saw which is the size of the desired diameter hole is mounted on the second arbor. The assembly is attached to a drill or other rotating driving means and the first hole saw is placed into the existing opening where it acts as a pilot bit for the second hole saw. Use of the first hole saw as a pilot can also be applied to rabbeting, bevelling, grooving or sanding the existing hole by attaching different blades in place of the second hole saw.

13 Claims, 2 Drawing Sheets

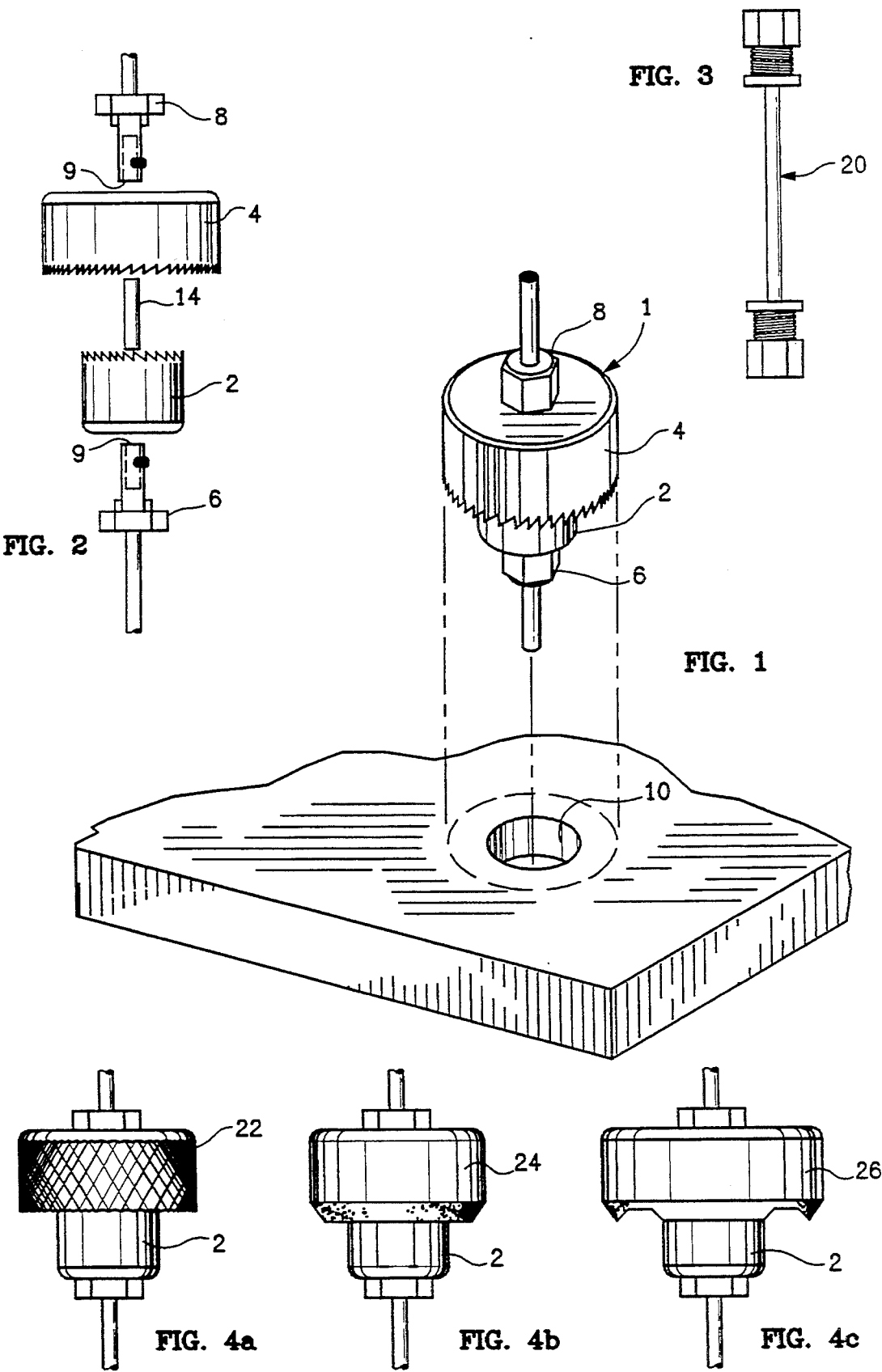

DOUBLE-SIDED HOLE SAW

This is a continuation-in-part of application Ser. No. 07/840,135, filed Feb. 24, 1992, now abandoned.

BACKGROUND OF THE INVENTION

Cabinet making and carpentry in general require precise location of hardware such as hinges, pulls (handles, knobs) and fasteners. The installation of electrical fixtures also requires accurate placement relative to some reference point or at a given spacing between fixtures.

Hole saws are well known and widely used for making circular holes of specific diameters. The holes can be accurately placed by center to center measurement. The hole saw is attached to a drill bit which acts as a pilot to guide the hole saw at the location determined by the center-to-center measurement.

One of the major problems encountered in the use of hole saws occurs when a hole is drilled incorrectly and needs to be redrilled to a larger size. Under current practice, in order to properly center the new hole, the existing hole must be plugged so that the pilot drill bit can be used. This results in extra work and lost time.

It would be desirable to provide a hole saw which would permit correct centering of a new hole without having to plug the existing hole. The present invention provides such a device.

SUMMARY OF THE INVENTION

It is an advantage of the present invention to provide a hole saw which can easily redrill a larger hole over an existing hole without plugging the existing hole. It is a further advantage of the present invention to provide such an error correcting hole saw that can be made simply and inexpensively from existing, commercially available components.

Another advantage of the present invention is that shaping or sanding of a previously-cut hole can be performed with proper centering.

In an exemplary embodiment, a shaft having a first end and a second end has a diameter suitable for fitting within a drill chuck or other conventional rotating driving means. A fixed length of said shaft at the second end is used for insertion into the driving means. Adjacent the fixed length, a second arbor is fixedly disposed on the shaft. The second arbor is generally cylindrical with a threaded portion, a small flange and a large flange. A first arbor is disposed at the first end of the shaft and has a releasable locking means by which the first arbor can be positioned along the first end of the shaft. The first arbor is substantially identical to the second arbor, having a cylindrical shape, a threaded portion, a small flange and a large flange. A second hole saw which is the size of the desired diameter hole is mounted on the shaft at the second arbor, locked in place with a second nut with internal threading corresponding to the threaded portion. A first hole saw, which has a diameter corresponding to the incorrectly cut hole, is mounted on the shaft at the first arbor, locked in place with a first nut with internal threading corresponding to the threaded portion. The locking means of the first arbor may be released to allow the arbor to be slid along the length of the first end of the shaft then tightened so that the cutting edge of the second hole saw overlaps the cutting of the first hole saw.

In an alternate embodiment, hole saws are mounted on two separate conventional arbors which are then placed end-to-end and joined by a pin which is inserted and locked into the existing bores of the arbors so the cutting edge of the second hole saw faces into the first hole saw.

In each embodiment, the assembly is attached to a drill or other rotating driving means and the first hole saw is placed into the existing opening where it acts as a pilot bit for the second hole saw. Thus, the correct diameter hole is properly centered without the additional work of plugging the existing hole.

Use of the first hole saw as a pilot can also be applied to rabbeting, bevelling, grooving or sanding the existing hole by attaching different blades in place of the second hole saw.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 1 is a perspective view of the double-sided hole saw of the present invention;

FIG. 2 is an exploded side view of the double-sided hole saw;

FIG. 3 is a side view of the double arbor of the preferred embodiment;

FIGS. 4a–4c are side views of blades and attachments which can be used according to the present invention;

DETAILED DESCRIPTION OF THE PREFERRED EMBODIMENT

Figure 5:
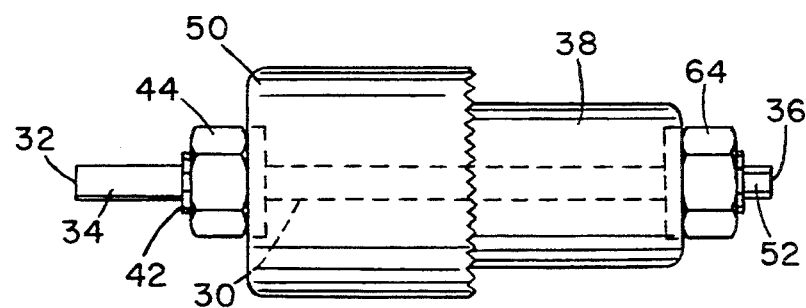
FIG. 5 is a side elevation of the embodiment of FIG. 3 with two hole saws mounted on double arbor.

As illustrated in FIGS. 1 and 2, double-sided hole saw 1 comprises hole saw 2 and hole saw 4, each mounted on their respective arbors (also known as mandrels) 6 and 8. Hole saw 2 has a smaller diameter than that of hole saw 4 and is the same saw, or a saw of the same diameter, that was used to cut the hole 10 which was subsequently found to be of an incorrect diameter. Hole saw 4 has a diameter corresponding to the desired hole size. Hole saw 2 is mounted on arbor 6 so that its cutting edge 12 faces away from hole 10. Arbors 6 and 8 are placed end-to-end and joined by pin 14. Pin 14 is inserted into the bore 9 in which a pilot drill bit would normally be inserted, and is locked in place by the same means as that for the drill bit so that hole saw 2 and hole saw 4 are facing each other and are concentric. Pin 14 is made of hardened steel or a sufficiently hard metal to withstand the torque generated while cutting and may be replaced by any other attachment means that will hold arbors 6 and 8 together end-to-end.

With the exception of pin 14, the above-described double-sided hole saw is assembled from commercially-available components.

Since hole saw 2 was used to cut hole 10, or is the same diameter, it will fit perfectly within the hole as it was originally centered, providing a pilot bit. Thus, arbor 8 follows the same line as arbor 6 so that hole saw 4 is centered at the same point on which hole saw 2 was centered. Hole saw 2 will be maintained at center through the entire thickness of the surface cut, providing a straight guide for hole saw 4. It is preferable that hole saw 2 not be entirely nested within hole saw 4 so that guidance is provided before hole saw 4 begins cutting. The length of pin 14 can be adapted to provide the desired relative positions of the saws. It is possible to have the cutting edges of both hole saws facing toward the hole 10, however, there may be some risk of off-center cutting if hole saw 2 shaves off additional material, expanding the diameter of hole 10.

In the preferred embodiment, a specially made arbor 20, illustrated in FIG. 3, is created to enable two hole saws to be mounted facing each other. Shaft 30 has a diameter adapted to fit within conventional rotating driving means for hole saws, e.g., drills. The shaft's length is sufficiently long to provide a section 34 for insertion into the chuck of the driving means at its second end 32 and to allow two hole saws with lengths corresponding to the longest of the commercially available, conventional hole saws to be mounted facing each other with only a small degree of overlap. At the first end 36, additional length is provided to adjust the position of the first hole saw 38 along the shaft.

Second arbor 40 is cylindrical in shape and has a bore therethrough for insertion over shaft 30. A threaded portion 42 has external threads which correspond to the internal threads of locking nut 44. The arbor has a flange with two diameters. The smaller diameter flange 46 has chords cut across it to form a truncated circle which corresponds to the conventional mounting hole for hole saws. The larger diameter flange 48 is larger than the mounting hole of the hole saw to prevent movement of the hole saw once it is locked in place. After second hole saw 50 is positioned over flange 46, locking nut 44 is screwed onto the second arbor 40 to lock the second hole saw 50 in place.

Second arbor 40 is preferably fixed along the length of shaft 30 so that section 34 has a fixed length on the order of ⅞" (22.2 m). It may be fixed to the shaft by welding or hot pressing, or by using a set screw or locking pin.

First end 36 of shaft 30 has a flattened portion 52 formed along its length to facilitate firm locking of the first arbor 54 once it is in the desired position. First arbor 54 is of the same or similar construction as second arbor 40, with a threaded portion 56, smaller flange 58 and larger flange 60. Set screw 62 is driven through a radial bore through smaller flange 58 and pitted against flattened portion 52 to firmly hold the arbor 54 in place. Locking nut 64 holds first hole saw 38 in place over the first arbor 54.

The positioning of first arbor 54 is determined by the length of the first and second hole saws. For optimal guidance, there should be at least some overlap of the cutting edges of the hole saws, and the amount of extension of first hole saw 38 from second hole saw 50 will depend upon the thickness of material through which the cut is to be made. The greater the amount that first hole saw 38 extends beyond the cutting edge of second hole saw 50, the more guidance is provided. Nonetheless, if appropriate, the first hole saw can be nested within the second hole saw with only a small amount of extension.

Since first hole saw 38 was used to cut the hole, or is the same diameter, it will fit perfectly within the hole as it was originally centered, providing a pilot bit. Thus, second arbor 30 follows the same line as arbor 54 so that second hole saw 50 is centered at the same point on which first hole saw 38 was centered. Second hole saw 50 will be maintained at center through the entire thickness of the surface cut, providing a straight guide for first hole saw 38.

The double-sided hole saw of the present invention uses the worker's existing tools so that no major new purchases are required. The only new piece is the pin or the double arbor. The double-sided hole saw provides a simple and quick means for correcting improper (too small) hole sizes, thereby eliminating the need for time consuming remedial measures.

The double-sided hole saw may also be used to rabbet the hole by cutting only part way through the existing hole with the larger hole saw 4 or 50. The rabbet will be perfectly centered by the pilot hole saw 2 or 38.

The hole saw 2 or 38 may also be used in combination with other arbor-mounted blades or grinding surfaces to guide the tool through a pre-existing hole so that the tool is correctly centered. Examples of the various tools are illustrated in FIGS. 4a–4c. A grooved cylinder 22 is formed from a blank hole saw blade which has a slightly larger diameter than hole saw 2, as shown in FIG. 4a. The grooved surface acts as a file to smooth the inside walls of the hole and to increase the hole diameter by a small amount. A chamfered blade 24 can be attached to the arbor and guided by pilot hole saw 2 to bevel the edge of the existing hole, as shown in FIG. 4b. A concentric groove encircling the hole can be created by attaching an abrasive shaper blade 26 to the arbor and guiding it with hole saw 2, as in FIG. 4c. A number of variations of cutting or shaping in or near a pre-existing hole using a rotating driving means can be precisely centered by use of the pilot hole saw 2 according to the present invention, and are included with the scope of the invention.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A tool for selective removal of material from a work surface which is centered on a previously-cut hole of a first diameter, said tool comprising:
   a first hole saw having said first diameter;
   a circular blade having an edge for removal of said material; and
   an arbor assembly for mounting said first hole saw and said circular blade with said circular blade facing toward said first hole saw, said arbor assembly comprising:
   a shaft having a first end and a second end and a diameter adapted to fit within a rotating driving means at said second end;
   a first arbor disposed on said shaft adjacent said first end, said first arbor adapted for releasably retaining said first hole saw on said shaft and having means for adjusting a position of said first hole saw along a portion of a length of said shaft;
   a second arbor fixedly disposed adjacent said second end, said second arbor adapted for releasably retaining said circular blade;
   wherein said first hole saw guides said circular blade so that said circular blade in concentric with said previously-cut hole.

2. A tool as in claim 1 wherein a cutting edge of said first hole saw is nested within said circular blade.

3. A tool as in claim 1 wherein said shaft has a flattened portion at said first end and said first arbor has a releasable locking means which cooperates with said flattened portion to releasably lock said first arbor at a preselected position of said shaft.

4. A tool as in claim 1 wherein said circular blade is a second hole saw.

5. A tool as in claim 1 wherein said circular blade has a bevelled cutting edge.

6. A tool as in claim 1 wherein said circular blade is a file.

7. A tool as in claim 1 wherein said circular blade is an abrasive shaper.

8. A tool for centering a second hole saw of a second diameter over a previously cut hole of a first diameter in a work surface, said tool comprising:
- a shaft having a first end and a second end, said second end adapted for attachment to a rotating driving means;
- a first arbor slideably disposed at said first end for mounting said first hole saw for retaining said first hole saw, said first arbor having a locking means for releasably locking said first arbor at a preselected position along said shaft;
- a second arbor fixedly disposed at said second end of said shaft for retaining said second hole saw; and
- wherein said first arbor is disposed on said shaft so that said first hole saw is at least partially nested within said second hole saw and first hole saw guides said second hole saw so that said second hole saw is concentric with said previously cut hole.

9. A method for centering a circular blade of a second diameter over a previously cut hole of a first diameter, said method which comprises:
- selecting an arbor assembly having a fixed mounting means and a slideable mounting means;
- mounting said circular blade on a fixed portion of said arbor assembly;
- mounting a first hole saw having said first diameter on a slideable portion of said arbor assembly so that said circular blade is directed toward said first hole saw and so that said first hole saw is concentric with said circular blade;
- mounting said arbor assembly in a driving means; and
- inserting said first hole saw into said previously cut hole to guide and center said circular blade.

10. A method as in claim 9 wherein the step of mounting said circular blade includes selecting a second hole saw as said circular blade.

11. A method as in claim 9 wherein the step of mounting said circular blade includes selecting a bevelled cutting edge as said circular blade.

12. A method as in claim 9 wherein the step of mounting said circular blade includes selecting a file as said circular blade.

13. A method as in claim 9 wherein the step of mounting said circular blade includes selecting an abrasive shaper as said circular blade.

* * * * *